(12) United States Patent
Lewis et al.

(10) Patent No.: US 8,714,398 B2
(45) Date of Patent: May 6, 2014

(54) RIGID DURABLE NON-METALLIC RELEASE LAMINATE FOR OVEN COOKING AND OVEN CONTAINING SAME

(75) Inventors: William James Lewis, Woodstock, IL (US); William Christopher Lewis, Algonquin, IL (US); Dale Marie Lewis, Woodstock, IL (US)

(73) Assignee: Advanced Flexible Composites, Inc., Lake in the Hills, IL (US)

( * ) Notice: Subject to any disclaimer, the term of this patent is extended or adjusted under 35 U.S.C. 154(b) by 729 days.

(21) Appl. No.: 12/820,859

(22) Filed: Jun. 22, 2010

(65) Prior Publication Data
US 2011/0311701 A1 Dec. 22, 2011

(51) Int. Cl.
*A47J 36/04* (2006.01)
*A47J 36/02* (2006.01)

(52) U.S. Cl.
CPC .............. *A47J 36/04* (2013.01); *A47J 36/025* (2013.01)
USPC ...................................... 220/573.3

(58) Field of Classification Search
CPC .......... A47J 36/025; A47J 36/04; A47J 37/10
USPC ........................ 220/573.3, 573.2, 573.1, 912
See application file for complete search history.

(56) References Cited

U.S. PATENT DOCUMENTS

| | | | | |
|---|---|---|---|---|
| 2,951,004 A | * | 8/1960 | Rambosek et al. | 156/306.9 |
| 3,143,241 A | * | 8/1964 | Howell | 220/573.2 |
| 3,788,513 A | * | 1/1974 | Racz | 428/622 |
| 3,930,806 A | * | 1/1976 | Racz | 428/674 |
| 4,250,215 A | * | 2/1981 | Mayer | 206/524.3 |
| 4,360,124 A | | 11/1982 | Knaus et al. | |
| 4,877,932 A | | 10/1989 | Bernstein et al. | |
| 4,933,193 A | | 6/1990 | Fisher | |
| 5,004,121 A | | 4/1991 | Howe | |
| 5,094,706 A | | 3/1992 | Howe | |
| 5,322,182 A | | 6/1994 | Fritz | |
| 5,385,765 A | | 1/1995 | Springer et al. | |
| 5,970,856 A | | 10/1999 | Fabrikant et al. | |
| 6,120,863 A | | 9/2000 | Neculescu et al. | |
| 6,359,272 B1 | | 3/2002 | Sadek et al. | |
| 6,756,095 B2 | * | 6/2004 | Sandt et al. | 428/40.1 |
| 6,919,547 B2 | | 7/2005 | Tsontzidis et al. | |
| 6,942,120 B2 | | 9/2005 | Trent et al. | |
| 2004/0126576 A1 | * | 7/2004 | Kinning et al. | 428/352 |
| 2005/0145623 A1 | | 7/2005 | Pool et al. | |
| 2007/0141335 A1 | | 6/2007 | Perera et al. | |
| 2007/0261567 A1 | | 11/2007 | Morgan | |
| 2008/0178747 A1 | | 7/2008 | Baker et al. | |
| 2009/0110935 A1 | * | 4/2009 | Lewis et al. | 428/421 |
| 2011/0023726 A1 | * | 2/2011 | Nesbitt | 99/443 C |

FOREIGN PATENT DOCUMENTS

| | | |
|---|---|---|
| EP | 0 235 037 | 9/1987 |
| GB | 594075 | 11/1947 |
| GB | 1262296 | 2/1972 |
| GB | 2406259 | 3/2005 |
| GB | 2406489 | 3/2005 |

* cited by examiner

*Primary Examiner* — Robert J Hicks
(74) *Attorney, Agent, or Firm* — Pauley Petersen & Erickson

(57) ABSTRACT

A rigid, durable non-metallic release laminate for holding food products during baking, cooking, toasting and other processing is provided. By eliminating the use of metal, the laminate of the invention can be readily manufactured in a variety of shapes and forms. The laminate can be used in a wide variety of ovens, including without limitation a conventional baking oven, microwave oven, toaster oven, convection oven, or multi-technology oven.

20 Claims, 3 Drawing Sheets

RIGID DURABLE NON-METALLIC RELEASE LAMINATE FOR OVEN COOKING AND OVEN CONTAINING SAME

BACKGROUND OF THE INVENTION

1. Field of the Invention

This invention is directed to a rigid and durable non-metallic release laminate for holding food items that are being processed in a conventional baking oven, microwave oven, toaster oven, convection oven, multi-technology oven, or other oven type.

2. Discussion of Related Art

Various structures are known for use as baking sheets, pizza pans, microwave oven plates, and the like which directly support food in an oven. Rigid baking sheets and pans used in conventional ovens are often made from metal or glass. While these materials have excellent heat resistance, they may not easily release the food product after completion of cooking. It can require significant effort to remove the food product and scrape the residual food from the metal or glass surface.

This problem has been alleviated in metal structures by covering the surface exposed to the food with porcelain, silicone resin, polytetrafluoroethylene or a metallic composite that is tailored for easy release of the food. While these improved structures are useful in conventional baking ovens and toaster ovens, they are not very useful in microwave ovens where metal can interfere with the cooking process. Furthermore, metal-based structures can undesirably retain heat after removal from the oven due to the high thermal conductivity and capacity of metal. The support plates used in microwave ovens are often formed from tempered glass, which is not easily coated with a release material.

Also known in the art are disposable release laminates formed of wax-coated paper, PTFE-coated foil, and other inexpensive and lightweight materials. These structures are typically not durable, in that they are only intended for single use and will not withstand repeated washings. Also, they typically hold only a single food product or single servings of a few food products, and are not large enough or strong enough for larger-scale uses.

There is a need for a durable and self-supporting material for use in forming baking sheets or other cooking structures. There is also a need for a material that does not retain heat long after removal from a heat source.

SUMMARY OF THE INVENTION

This invention is directed to a rigid, durable non-metallic release laminate which can replace metal-based, ceramic-based, and tempered glass food support structures used in conventional, convection, and/or microwave ovens. The invention is also directed to an oven which contains the rigid, durable non-metallic release laminate of the invention.

The laminate of the invention includes at least a non-metallic release layer and a non-metallic support layer. The term "non-metallic" means that each layer is devoid of metals. The laminate may include non-metallic release layers on both sides of the non-metallic support layers. The laminate may include additional layers such as additional support layers, adhesive layers, spacing layers, and the like.

The laminate of the invention is semi-rigid or rigid so as not to collapse under the weight of the food on the laminate. This means that the laminate has a flexural modulus of about 250,000 psi to about 1,300,000 psi, measured using ASTM D790, Method A. The laminate of the invention is also durable. This means that it can withstand repeated washings without experiencing noticeable deformation, delamination or damage.

The laminate of the invention is suitably temperature-resistant. This means that it can withstand exposure to temperatures of at least about 260° C. (500° F.), and preferably 260° C. to 302° C. (well above typical cooking or baking temperatures), for at least about 60 minutes without melting or experiencing noticeable deformation, delamination or damage.

The general object of the invention can be attained, at least in part, through a durable self-supporting non-metallic release laminate for supporting food items during cooking or baking in an oven, which includes an outer non-metallic release layers and more than one non-metallic support layer. The laminate is sized to fit in the oven and has an outer peripheral edge of the laminate extending around a food placement area of the outer non-metallic release layer. The laminate has a flexural modulus of about 250,000 psi to about 1,300,000 psi and can withstand a temperature of at least about 260° C. for at least about 60 minutes.

The invention further comprehends a durable self-supporting non-metallic release laminate for supporting food items during cooking or baking in an oven, which includes a first non-metallic support layer, a second non-metallic support layer, a non-metallic adhesive support layer between the first and second non-metallic support layers, and an outer non-metallic release layer on a side of the first non-metallic support layer that is opposite the second non-metallic support layer. The outer non-metallic release layer forms a food placement area on the release laminate.

The invention further comprehends a combination including an oven and a durable self-supporting non-metallic release laminate of this invention. The non-metallic release laminate can include one or two outer non-metallic release layers, each comprising a fluoropolymer, two non-metallic support layers between the non-metallic release layers, and a non-metallic adhesive support layer between the two non-metallic support layers. The laminate can be formed as a baking sheet, a pizza pan, a tray, a plate, a skillet, or a bowl.

The oven referred to herein, which contains the laminate of the invention, can be a conventional baking oven, microwave oven, toaster oven, convection oven, multi-technology oven, grill, or other oven type. The laminate of the invention can be formed as a flat sheet or tray, or may be molded or shaped into a dish, bowl, pan or other container for use in the oven. The laminate of the invention desirably should have a thickness of about 0.020 inches to about 0.125 inches, and should be sufficiently thick (depending on the number and type of layers used) to self-support the products being cooked, thereby not requiring a metal baking sheet or other cookware thereunder as a support.

BRIEF DESCRIPTION OF THE DRAWINGS

These and other objects and features of the invention will be better understood from the following detailed description taken in conjunction with the drawings, which are not drawn to scale.

DESCRIPTION OF PRESENTLY PREFERRED EMBODIMENTS

Figure 1:
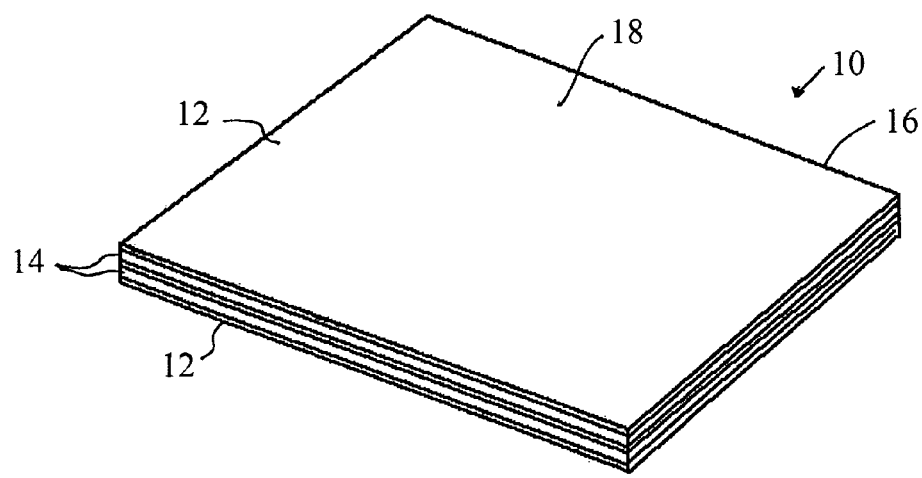
FIG. 1 is a perspective view of a representative durable non-metallic release laminate of the invention.

Referring to FIG. 1, a rigid, non-metallic release laminate 10 of the invention includes at least one non-metallic outer release layer 12 and more than one inner non-metallic support layer 14. The laminate 10 suitably includes two outer release layers 12 as shown, in order to enable both sides of the laminate 10 to alternatively support the products that are being baked, toasted or cooked.

Each outer release layer 12 is suitably formed of a temperature-resistant release polymer that can withstand temperatures of at least about 260° C., suitably between about 260° C. and 302° C., for at least about 60 minutes without melting or experiencing noticeable deformation, delamination or damage. The release polymer is suitably one that easily releases food products from the laminate 10 in a cooked, uncooked or partially cooked state. Suitable release polymers include without limitation fluoropolymers, fluoroelastomers, silicone rubbers, silicone resins, urethane rubbers, urethane resins, polyketones, polyamide-imides, polyphenylene sulfides, polyesters, liquid crystal polyesters, polyether sulfones and combinations thereof. A particularly suitable release polymer is a fluoropolymer such as polytetrafluroethylene, hexafluoropolypropylene, hydrofluorocarbon fluoropolymers that are crosslinked with at least one of an amide-based or amino-based crosslinking agent, such as disclosed in PCT International Patent Application PCT/US2008/079970 (WO2009052163), herein incorporated by reference, and combinations thereof. Each release layer 12 may have a thickness of about 0.0005 inches to about 0.015 inches, more suitably about 0.0025 inches to about 0.015 inches, and desirably about 0.003 inches to about 0.010 inches. When the release layer is a pure polymer film, a suitable thickness is about 0.0005 inches to about 0.003 inches.

The materials of support layers 14, particularly in combination with the release and other polymer layers, impart strength and rigidity to the laminate 10. The support layer 14 can be formed from a variety of rigid or semi-rigid temperature-resistant non-metallic materials that satisfy the temperature requirements indicated above for each release layer 12. Suitable support layers 14 include, without limitation, woven, nonwoven or braided fabrics or sheets, netting, tapes, meshes and/or films of materials such as fiberglass, ceramics, graphite, glass, and/or rigid temperature-resistant polymers such as polybenzimidazole, polytetrafluoroethylene, polyaramid, polyesters, polyamides, polyimides, polyethersulfones, polyether imides, polyetherether ketones, polyether ketones, liquid crystal polymers, polyphenylene sulfones, polyphenylene sulfides, novoloid phenolic fibers, aramids, polysulfones, polyketones, and combinations thereof. A particularly suitable support layer material is fiberglass sheets (e.g., plain or satin weave) or meshes (e.g., leno weave), and the invention will be described below with reference to fiberglass sheets or meshes as the support material.

In one embodiment of this invention, one or more of the support layers 14 is formed from a polymer coated fiberglass sheet or mesh. The polymer material coating the fiberglass can be applied by known procedures, such as spray or dip coating. The polymer material can be the same as or different from the release polymer of release layer 12. The polymer material coating can also form the outer release layer 12. The support layer 14 may have a thickness of about 0.010 inches to about 0.038 inches, suitably about 0.015 inches to about 0.030 inches.

In one embodiment of this invention, the rigidity providing the self-supporting laminate 10 is provided by the combination of the more than one support layers 14 with the polymer coatings adhering them together. The support layers 14 may be non-rigid or flexible before laminated, but once laminated, the material layers are adhered or otherwise locked together to impart the desired self-supporting rigidity to support food items placed thereon. The adhesion of the more than one support layer 14 can be provided by the contact and curing or sintering of the polymer coating materials, or by a separate adhesive support layer provided between the coated fiberglass materials. The support layer 14 may also include a combination of adjacent support layers which, taken together, constitute a rigid support layer having the desired properties.

The overall laminate 10 has a flexural modulus of about 250,000 psi to about 1,300,000 psi, and more suitably about 300,000 psi to about 900,000 psi, measured using ASTM D790, Method A. The laminate 10 can also withstand temperatures of at least about 260° C. for at least about 60 minutes without melting or experiencing noticeable deformation, delamination or damage. The laminate 10 may have an overall thickness of about 0.020 inches to about 0.175 inches, more suitably about 0.025 inches to about 0.125.

The laminate of FIG. 1 is shown as a rectangular sheet, suitable for, without limitations, cooking pizza, cookies, or other food items. The laminate has an outer peripheral edge 16 that defines a food placement area 18. The size of the laminate sheet can vary, and desirable has a size that fits into the intended oven and onto the oven rack. In one embodiment, the sheet has a largest dimension of not more than three feet, more suitably not more than two feet. Desirably no dimension of the laminate sheet is larger than these dimensions. The laminate shown in FIG. 1 is a planar sheet, and not a belt for automated cooking processes. Various and alternative shapes are available for the laminate of this invention, such as, without limitation, squares, rectangles, circles, polygons, triangles, ovoids, or ellipses.

The laminate of this invention has a benefit in being self-supporting, namely no additional baking sheet (e.g., metal) is required to support food items placed on the sheet. In one embodiment, a method of cooking or baking with the laminate of this invention includes: placing an uncooked food item on the food placement area; placing the laminate directly on a rack of the oven; cooking the uncooked food on the laminate material by thermal energy from the oven to provide a cooked food item; removing the laminate material from the rack with the cooked food item thereon; and removing the cooked food item from the laminate material.

The non-metallic laminate has a further benefit in having low heat retention properties. In this way the laminate cook or bakeware of this invention reduces the risk of burning the user, as heat is dissipated from the laminate soon after removal from the heat source. The low heat retention also benefits the cooking. The low heat retention of the laminate reduces additional "cooking" that can occur with a metal sheet even after removal from an oven. Also, the portion of the food touching the laminate is generally the last portion to cook, thereby reducing the possibility of burning the bottom side of the food. Further, because the material is not a thermal conductor, the cooking energy goes directly to the food.

Figure 2:
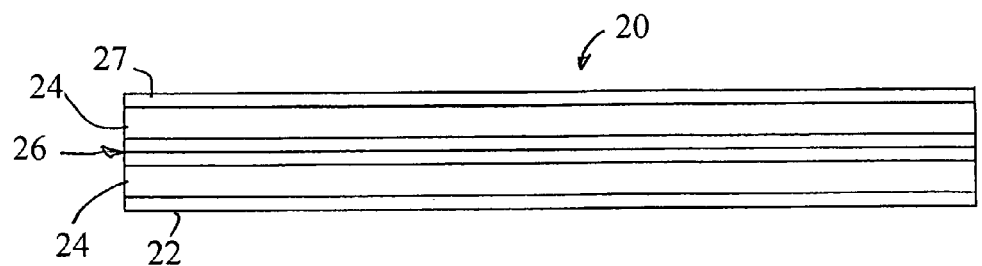
FIGS. 2-5 are side sectional views of exemplary laminates of the invention.

FIG. 2 illustrates a side view of a two-support layer rigid, non-metallic release laminate 20 of the invention. The laminate 20 includes two outer non-metallic release layers 22, two interior non-metallic support layers 24, and a non-metallic adhesive support layer 26. The release layers 22 and the support layers 24 can be any of the materials discussed above. In this embodiment, the laminate is formed by adhering together two polymer coated (e.g., dip or spray coated) support materials. The polymer material acts as a release material forming the release layers 22 on the outer sides of each of the support layers 24. The polymer material on the inner sides of the release layers 24 are sintered together, in either a fused or unfused state, to form the adhesive support layer 26. For illustrative and explanation purposes, the figures show a delineation between the two polymer layers forming the adhesive layer 26, and it should be appreciated that such delineation between adhesive support layers may not be evident within an actual product due to the sintering or otherwise curing together of similar or identical polymer materials in the adjacent layers.

The adhesive support layer 26 can alternatively be or include any suitable heat resistant polymer able to withstand the temperatures of use for the laminate and able to bond to the support layer materials. Suitable adhesive polymers include, for example, polymer selected from the group consisting of polybenzimidazole, polytetrafluoroethylene, polyaramids, polyesters, polyamides, polyimides, polyether sulfones, polyether imides, polycarbonates, polyether ketones, polyetherether ketones, liquid crystal polymers, polyphenylene sulfones, polyphenylene sulfides, novoloid phenolic fibers, aramids, polysulfones, polyketones, fluoropolymers, fluoroplastics such as PFA or FEP, hydrofluorocarbon fluoropolymers that are crosslinked with at least one of an amide-based or amino-based crosslinking agent, and combinations thereof. The adhesive support layer 26 can be formed as a single layer applied to one of the support layers 24, or can be formed by curing an adhesive polymer applied to one of the support layers 24 to an adhesive polymer applied to the other of the support layers 24.

Figure 3:
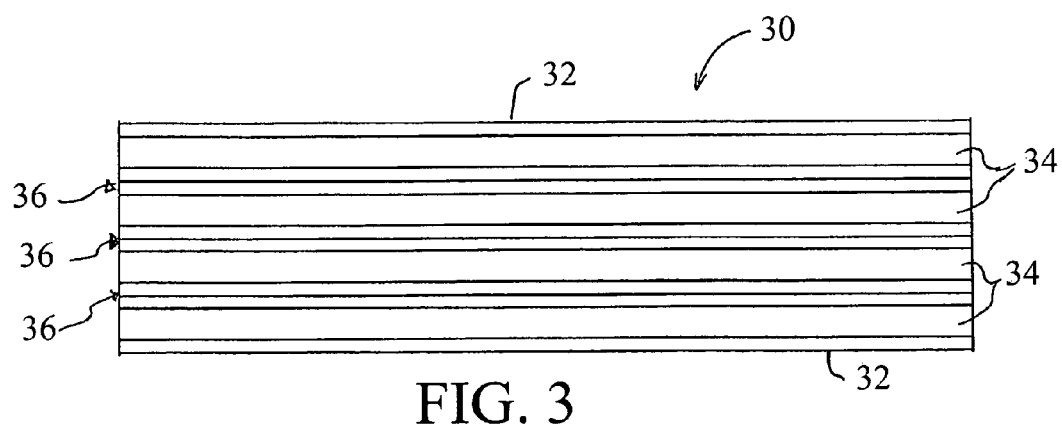

FIG. 3 illustrates a self-supported, non-metallic release laminate 30 of another embodiment of this invention. The laminate 30 of FIG. 3 includes two outer release layers 32 and four inner support layers 34. In one embodiment of this invention, each of the inner support layers 34 is a polymer coated support material. Each support material can be coated with an appropriate temperature resistant polymer and laminated to the other coated support materials by curing/sintering the polymer coatings, such as under pressure, to form an adhesive support layer 36 between each support layer 34 (as shown in FIG. 3), or applying a separate adhesive support layer 36 between cured polymer coatings.

In one particularly preferred embodiment of this invention, each of the support layers 34 is a fiberglass sheet. The two outer support layers 34 are desirably coated on both sides by a release polymer or polymer combination which on one side forms the corresponding one of the outer release layers 32. The two inner support layers 34, which are disposed between the two outer support layers 34, are desirably formed by fiberglass sheets coated on both sides by a suitable heat resistant polymer. The heat resistant polymers of the coated support layers 34 adhere to the adjacent polymer coating to form the adhesive support layers 36.

Figure 4:
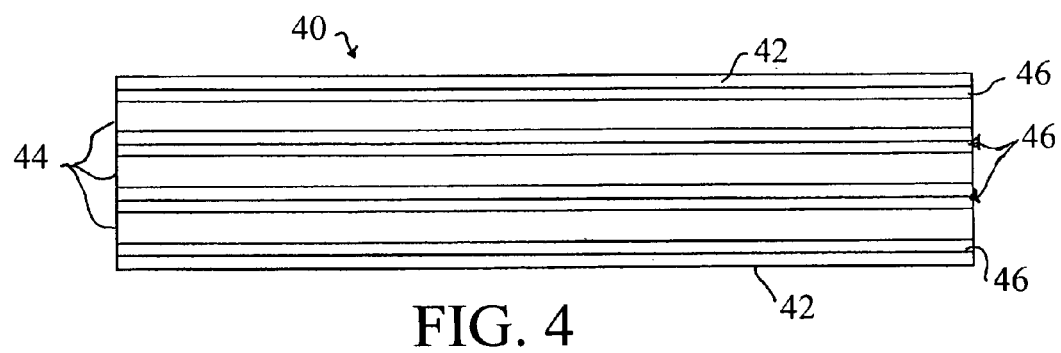

The non-metallic laminate of this invention can be made with various numbers of support layers and/or adhesive support layers. For example, only one or two inner non-metallic support layer may be necessary to impart the desired rigidity and strength, depending on the type and thickness of support materials and/or polymer coating/adhesive materials. FIG. 4 illustrates a non-metallic laminate 40 according to a further alternative embodiment. The non-metallic laminate 40 of FIG. 4 includes three non-metallic support layers 44, each surrounded on both side surfaces by a non-metallic adhesive support layer 46. In the embodiment of FIG. 4, the outer non-metallic release layers 42 are connected to the adjacent outermost support layers 44 by an intermediary adhesive support layer 46. In this embodiment, the outermost adhesive support layer 46 can be used to provide better adhesion of the release layer 42 to the support layer 44, where the release material does not bind or adhere particularly well to the support material, and/or to provide additional thickness or rigidity. The outermost adhesive support layer 46 may also be incorporated when the release layer 42 is applied as a film or sheet material.

Figure 5:
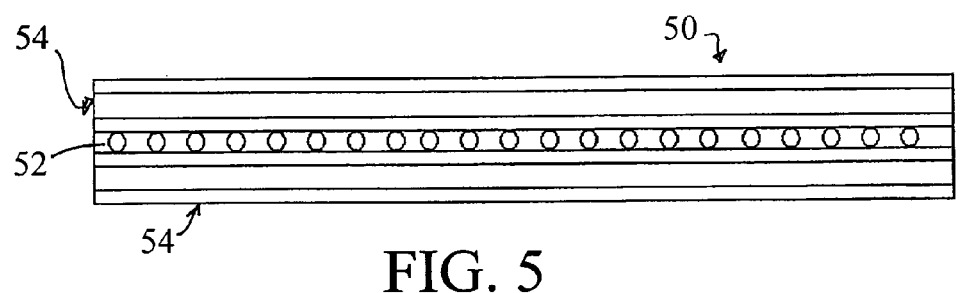

FIG. 5 is an end view of a non-metallic laminate 50 according to another embodiment of this invention. Laminate 50 includes a mesh support layer 52 between two polymer coated support layer sheets 54. The mesh support layer 52 can include a polymer coated mesh formed of the materials discussed above. The support layers 54 each are formed as, for example, a polymer coated fiberglass sheet. The laminate is sintered together, as discussed above, to mechanically bond the polymer materials together. The coated mesh material desirably includes the mesh openings that provide small spacings throughout the center layer of the laminate 50. The spacings provide air pockets that provide further heat insulation properties.

As will be appreciated from the several alternative configurations shown in FIGS. 1-5, various numbers, combinations and/or configurations of release layers, support layers, and adhesive support layers can be used to form an integrated rigid support laminate having the desired properties of flexural modulus and temperature resistance according to this invention. The individual layers can also vary in thickness and materials, such as thickness and type of support materials and/or polymer coating or adhesive layers. One advantage of employing multiple layers is that it enables greater manipulation of layer thickness such that layers of less expensive materials are relatively thicker, and layers of more expensive materials are relatively thinner, while maintaining the overall laminate thickness within ideal limits. For example, the release layers may not be as thick as the adhesive support layers, due to the higher cost of suitable release polymers. The variation of layer thickness also allows for manipulation of the materials used, the rigidity, and the strength of the laminate.

The layers of laminates 10, 20, 30, 40, and 50 can be combined using various known techniques, including without limitation coextrusion, thermal lamination, thermal pressing, extrusion coating, spray or dip coating, adhesive bonding, ultrasonic bonding, or a combination of known techniques. The resulting laminate, and all of its layers, are suitably non-metallic and temperature resistant. The resulting laminate, and at least one or a combination of layers, are strong and rigid and provide the desired flexural modulus.

Figure 6:
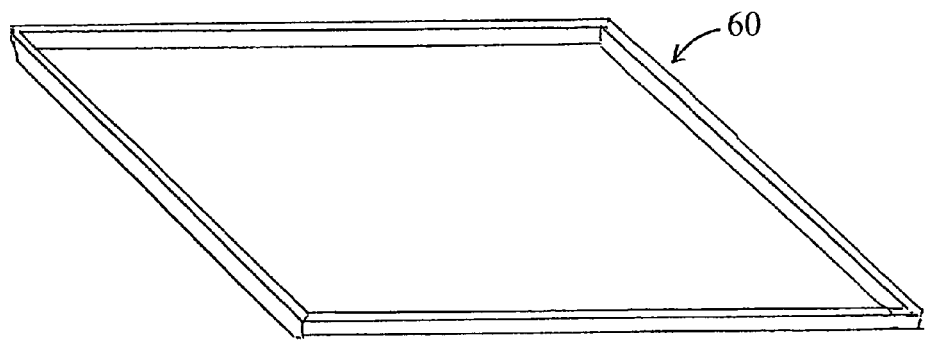
FIGS. 6-8 are perspective views of exemplary shapes and forms for the laminate of the invention.
Figure 7:
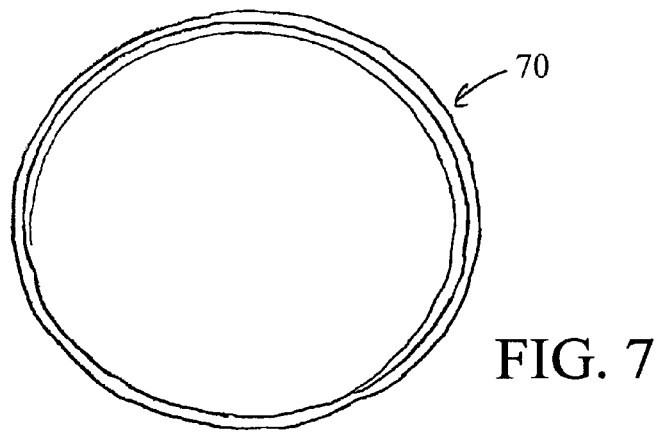
Figure 8:
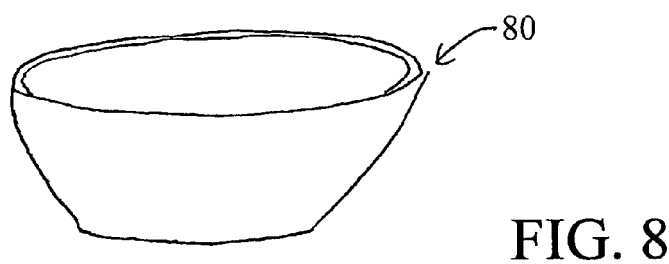

The rigid, durable non-metallic release laminate of the invention can be in the form of a flat plate or baking sheet, such as shown in FIG. 1, or may be molded or shaped into a variety of alternative forms. Exemplary forms include, without limitation, a rectangular tray 60 as shown in FIG. 6, a pizza pan or microwave tray 70 having an edge lip as shown in FIG. 7, or a skillet or bowl 80 as shown in FIG. 8. Other shapes and forms for the laminate are also considered to be within the scope of the invention. The forms can be formed by any suitable method. In one embodiment of this invention the forms are created using thermoforming methods, such as placing unfused coated support layers into a suitable mold and press forming and sintering in the formed position.

During use, the laminate of the invention is loaded with food product and placed into an appropriate oven. For example, the laminate (in any suitable form) may be directly positioned, without an additional support such as a metal baking sheet, on an oven rack in a conventional baking oven, on a floor or turntable of a microwave oven, on a floor or rack of a toaster oven, or on a rack or moving belt in a convection oven or a multi-technology oven. The laminate of the invention provides a lightweight, cost-effective, and self-supporting durable structure that can be used in combination with a wide variety of oven types. By eliminating the use of metal, the thermal conductivity and/or thermal mass can be reduced, as compared to an equivalent metal sheet, thereby providing bakeware or cookware that cools quickly upon removing from a heat source.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

The following Samples 1-8 were prepared using the materials described for each Sample and tested according to ASTM D790-07 Procedure A, with the following test parameters. Materials were obtained from Advanced Flexible Materials (AFC), Lake in the Hills, Ill.
Sample Type: ASTM Flex Bar
Span Length (inch): 1.0 inch
Cross-head Speed (in/min): 0.038 (Sample 1)
    0.030 (Sample 2)
    0.042 (Sample 7)
    0.030 (Sample 8)
Span:Depth Ratio: 16±1:1
Radius of Supports (inch): 0.197
Radius of Loading Nose (inch): 0.197
Conditioning: 40+ hours at 23° C.±2° C./50%±5% RH
Test Conditions: 23° C.±2° C./50%±5% RH
Sample 1
5 inch×0.045 inch strips, average thickness=0.0444"
3 layers of PTFE coated fiberglass (AFC ID 24-14) with black pigment (0.014 inch nominal thickness per layer)

| Test | Maximum Flexural Strength (PSI) | Strain at Maximum Strength (%) | Flexural Modulus (tangent *) (PSI) |
|---|---|---|---|
| 1 | 7510 | 1.6 | 704000 |
| 2 | 6390 | 1.8 | 675000 |
| 3 | 7580 | 1.5 | 755000 |
| 4 | 7450 | 1.7 | 769000 |
| 5 | 6880 | 1.6 | 737000 |
| Average | 7160 | 1.6 | 728000 |
| Std. Dev. | 513 | 0.1 | 38300 |

Sample 2
5 inch×0.056 inch strips, average thickness=0.0552"
4 layers of PTFE coated fiberglass (AFC ID 24-14) with black pigment (0.014 inch nominal thickness per layer)

| Test | Maximum Flexural Strength (PSI) | Strain at Maximum Strength (%) | Flexural Modulus (tangent *) (PSI) |
|---|---|---|---|
| 1 | 6510 | 2.6 | 743000 |
| 2 | 6640 | 2.7 | 740000 |
| 3 | 7150 | 2.8 | 708000 |
| 4 | 6670 | 1.9 | 657000 |
| 5 | 5900 | 4.4 | 431000 |
| 6 | 5750 | 4.4 | 521000 |
| Average | 6440 | 3.1 | 633000 |
| Std. Dev. | 523 | 1.0 | 129000 |

Sample 3
5 inch×0.555 inch strips, average thickness=0.0763"
6 layers of PTFE coated fiberglass (AFC ID 24-14) with black pigment (0.014 inch nominal thickness per layer)

| Test | Maximum Flexural Strength (PSI) | Strain at Maximum Strength (%) | Flexural Modulus (tangent *) (PSI) |
|---|---|---|---|
| 1 | 9540 |  | 816000 |
| 2 | 9760 |  | 855000 |
| 3 | 10200 |  | 867000 |
| 4 |  | 10900 | 905000 |
| 5 |  | 10500 | 850000 |
| Average | 9830 | 10700 | 859000 |
| Std. Dev. |  |  | 32100 |

Sample 4
5 inch×0.540 inch strips, average thickness=0.0197"
2 layers of PTFE coated fiberglass with engineered resin midcoat (AFC ID 70-10; 0.010 inch nominal thickness per layer)

| Test | Maximum Flexural Strength (PSI) | Flexural Modulus (tangent *) (PSI) |
|---|---|---|
| 1 | 10400 | 1140000 |
| 2 | 8050 | 1150000 |
| 3 | 7810 | 1210000 |
| 4 | 7580 | 1110000 |
| 5 | 12200 | 1180000 |
| Average | 9210 | 1160000 |
| Std. Dev. | 2020 | 38300 |

Sample 5
5 inch×0.560 inch strips, average thickness=0.0395"
4 layers of PTFE coated fiberglass with engineered resin midcoat (AFC ID 70-10; 0.010 inch nominal thickness per layer)

| Test | Flexural Strength (PSI) | Flexural Modulus (tangent *) (PSI) |
|---|---|---|
| 1 | 11800 | 1170000 |
| 2 | 12800 | 1160000 |
| 3 | 11900 | 1140000 |
| 4 | 11300 | 1010000 |
| 5 | 1200 | 1210000 |
| Average | 1200 | 1140000 |
| Std. Dev. | 541 | 76000 |

Sample 6
5 inch×0.556 inch strips, average thickness=0.0430"
4 layers of PTFE coated fiberglass with engineered resin midcoat (AFC-70-11T; 0.011 inch nominal thickness per layer)

| Test | Flexural Strength (PSI) | Flexural Modulus (tangent *) (PSI) |
|---|---|---|
| 1 | 12000 | 1000000 |
| 2 | 12200 | 1000000 |
| 3 | 12000 | 862000 |
| 4 | 11600 | 944000 |
| 5 | 12200 | 964000 |
| Average | 12000 | 954000 |
| Std. Dev. | 245 | 56800 |

Sample 7
5 inch×0.563 inch strips, average thickness=0.0830"
8 layers of PTFE coated fiberglass with engineered resin midcoat (AFC ID 70-10; 0.10 inch nominal thickness per layer) and 2 outer layers of PTFE coated fiberglass with bronze and red pigment (AFC ID 104RZ, 0.004 inch nominal thickness per layer)

| Test | Flexural Stress at 5% Strain (PSI) | Flexural Modulus (tangent *) (PSI) |
|---|---|---|
| 1 | 9070 | 653000 |
| 2 | 9060 | 607000 |
| 3 | 9340 | 735000 |
| 4 | 10000 | 706000 |
| 5 | 11300 | 692000 |
| Average | 9750 | 679000 |
| Std. Dev. | 945 | 49700 |

Sample 8
5 inch×0.531 inch strips, average thickness=0.0556"
PTFE coated fiberglass mesh fabric (AFC ID 27-48; 0.048 inch nominal thickness) between 2 layers of PTFE coated fiberglass with engineered resin midcoat (AFC ID 70-10; 0.010 inch nominal thickness per layer) and 2 outer layers PTFE coated fiberglass with bronze and red pigment (AFC ID 104RZ; 0.004 inch nominal thickness per layer)

| Test | Maximum Flexural Strength (PSI) | Flexural Stress at 5% Strain (PSI) | Flexural Modulus (tangent *) (PSI) |
|---|---|---|---|
| 1 | | 2860 | 252000 |
| 2 | 3150 | | 375000 |
| 3 | | 4620 | 363000 |
| 4 | | 3610 | 509000 |
| 5 | | 2840 | 348000 |
| Average | | 3480 | 369000 |
| Std. Dev. | | 839 | 91900 |

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A durable self-supporting non-metallic release laminate for supporting food items during cooking or baking in an oven, comprising:
    an outer non-metallic release layer;
    at least one non-metallic support layer; and
    an outer peripheral edge of the laminate extending around a food placement area of the outer non-metallic release layer;
    wherein the laminate has a flexural modulus of about 250,000 psi to about 1,300,000 psi and can withstand a temperature of at least about 260° C. for at least about 60 minutes.

2. The laminate of claim 1, wherein the laminate is self-supporting cookware or bakeware that is placed directly upon a rack or surface of an oven.

3. The laminate of claim 1, wherein the outer peripheral edge defines a shape selected from a square, rectangle, circle, polygon, triangle, ovoid, or ellipse.

4. The laminate of claim 1, wherein each of a length and a width of the laminate is less than about 36 inches.

5. The laminate of claim 1, comprising two outer non-metallic release layers with the at least one non-metallic support layer positioned in between the two outer non-metallic release layers.

6. The laminate of claim 1, wherein the release layer comprises a polymer selected from the group consisting of fluoropolymers, fluoroelastomers, hydrofluorocarbon fluoropolymers crosslinked with at least one of an amide-based or amino-based crosslinking agent, silicone rubbers, silicone resins, urethane rubbers, urethane resins, polyketones, polyamide-imides, polyphenylene sulfides, polyesters, liquid crystal polyesters, polyether sulfones, and combinations thereof.

7. The laminate of claim 1, wherein each of the at least one non-metallic support layer comprises a polymer coated support material.

8. The laminate of claim 1, wherein each of the at least one non-metallic support layer comprises a support material selected from the group consisting of fiberglass, ceramics, graphite, glass, polybenzimidazole, polytetrafluoroethylene, polyaramid, polyesters, polyamides, polyimides, polyethersulfones, polyether imides, polyetherether ketones, polyether ketones, liquid crystal polymers, polyphenylene sulfones, polyphenylene sulfides, novoloid phenolic fibers, aramids, polysulfones, polyketones, or combinations thereof.

9. The laminate of claim 8, wherein at least one of the at least one non-metallic support layer comprises a polymer coated sheet or polymer coated mesh material.

10. The laminate of claim 1, further comprising more than one non-metallic support layer, wherein the more than one non-metallic support layer comprises more than one layer of a non-metallic support material each separated and attached to an other of the more than one support material by a non-metallic adhesive layer.

11. The laminate of claim 10, wherein the non-metallic adhesive layer comprises a polymer selected from the group consisting of fluoropolymers, fluoroelastomers, hydrofluorocarbon fluoropolymers crosslinked with at least one of an amide-based or amino-based crosslinking agent, silicone rubbers, silicone resins, urethane rubbers, urethane resins, polyketones, polyamide-imides, polyphenylene sulfides, polyesters, liquid crystal polyesters, polyether sulfones, polybenzimidazole, polytetrafluoroethylene, polyaramids, polyesters, polyamides, polyimides, polyether sulfones, polyether imides, polycarbonates, polyether ketones, polyetherether ketones, polyphenylene sulfones, polyphenylene sulfides, novoloid phenolic fibers, aramids, polysulfones, and combinations thereof.

12. A method of cooking or baking with the laminate of claim 1, comprising:
    placing an uncooked food item on the food placement area;
    placing the laminate directly on a rack of the oven;
    cooking the uncooked food on the laminate material by thermal energy from the oven to provide a cooked food item;

removing the laminate material from the rack with the cooked food item thereon; and removing the cooked food item from the laminate material.

13. A durable self-supporting non-metallic release laminate for supporting food items during cooking or baking in an oven, comprising:

a first non-metallic support layer;

a second non-metallic support layer;

a non-metallic adhesive support layer between the first and second non-metallic support layers;

an outer non-metallic release layer on a first side of the first non-metallic support layer that is opposite the non-metallic adhesive support layer, the outer non-metallic release layer forming a food placement area on the release laminate.

14. The laminate of claim 13, wherein the laminate has a flexural modulus of about 250,000 psi to about 1,300,000 psi and can withstand a temperature of at least about 260° C. for at least about 60 minutes.

15. The laminate of claim 13, wherein each of the first side and a second side of the first non-metallic support layer opposite the first side is coated with a release polymer of the outer non-metallic release layer, and on the second side the release polymer forms at least a portion of the adhesive support layer.

16. The laminate of claim 13, further comprising a second outer non-metallic release layer disposed on a side of the laminate opposite the outer non-metallic release layer.

17. The laminate of claim 13, further comprising:

a third non-metallic support layer between the second non-metallic support layer and the second outer non-metallic release layer;

a second adhesive support layer between the second and third non-metallic support layers.

18. The laminate of claim 13, wherein:

the outer non-metallic release layer comprises a release polymer selected from the group consisting of fluoropolymers, fluoroelastomers, hydrofluorocarbon fluoropolymers crosslinked with at least one of an amide-based or amino-based crosslinking agent, silicone rubbers, silicone resins, urethane rubbers, urethane resins, polyketones, polyamide-imides, polyphenylene sulfides, polyesters, liquid crystal polyesters, polyether sulfones, and combinations thereof;

each of the first and second non-metallic support layers comprises a support material selected from the group consisting of fiberglass, ceramics, graphite, glass, asbestos, cotton, and combinations thereof; and the adhesive support layer comprises a polymer selected from the group consisting of fluoropolymers, fluoroelastomers, hydrofluorocarbon fluoropolymers crosslinked with at least one of an amide-based or amino-based crosslinking agent, silicone rubbers, silicone resins, urethane rubbers, urethane resins, polyketones, polyamide-imides, polyphenylene sulfides, polyesters, liquid crystal polyesters, polyether sulfones, polybenzimidazole, polytetrafluoroethylene, polyaramids, polyesters, polyamides, polyimides, polyether sulfones, polyether imides, polycarbonates, polyether ketones, polyetherether ketones, liquid crystal polymers, polyphenylene sulfones, polyphenylene sulfides, novoloid phenolic fibers, aramids, polysulfones, polyketones, and combinations thereof.

19. A combination including an oven and the laminate according to claim 13.

20. A combination including an oven and a durable self-supporting non-metallic release laminate for supporting food items during cooking or baking in the oven, wherein the non-metallic release laminate comprises:

two outer non-metallic release layers, each comprising a fluoropolymer;

two non-metallic support layers between the non-metallic release layers;

a non-metallic adhesive support layer between the two non-metallic support layers;

wherein the laminate has a flexural modulus of about 250,000 psi to about 1,300,000 psi and can withstand a temperature of at least about 260° C. for at least about 60 minutes and the laminate is formed as one of a baking sheet, a pizza pan, a tray, a plate, a skillet, or a bowl with an outer peripheral edge of the laminate extending around a food placement area of one of the outer non-metallic release layers.

* * * * *